(12) United States Patent
Goncalves De Oliveira

(10) Patent No.: US 8,366,045 B2
(45) Date of Patent: Feb. 5, 2013

(54) APPARATUS WITH DAMAGE INDICATION FEATURE

(75) Inventor: Andre Rossi Goncalves De Oliveira, Bristol (GB)

(73) Assignee: Airbus Operations Limited, Bristol (GB)

( * ) Notice: Subject to any disclaimer, the term of this patent is extended or adjusted under 35 U.S.C. 154(b) by 495 days.

(21) Appl. No.: 12/680,203

(22) PCT Filed: Sep. 29, 2008

(86) PCT No.: PCT/GB2008/050879
§ 371 (c)(1), (2), (4) Date: Mar. 26, 2010

(87) PCT Pub. No.: WO2009/044191
PCT Pub. Date: Apr. 9, 2009

(65) Prior Publication Data
US 2010/0308163 A1 Dec. 9, 2010

(30) Foreign Application Priority Data
Oct. 4, 2007 (GB) .................................. 0719272.7

(51) Int. Cl.
*B64C 1/00* (2006.01)
(52) U.S. Cl. .................. 244/129.1; 244/17.27; 244/108; 403/2
(58) Field of Classification Search ............... 244/129.1, 244/108, 109.102 R, 100 R, 102 A, 131; 188/377, 376
See application file for complete search history.

(56) References Cited

U.S. PATENT DOCUMENTS

| 4,322,981 | A | * | 4/1982 | Radwill .......................... 73/810 |
| 4,392,623 | A | * | 7/1983 | Munsen et al. ............ 244/102 R |
| 5,599,129 | A | * | 2/1997 | Clifton et al. ..................... 403/2 |
| 5,614,680 | A | * | 3/1997 | Fussinger ....................... 73/799 |

(Continued)

FOREIGN PATENT DOCUMENTS

| GB | 2312532 A | 10/1997 |
| WO | 0148884 A1 | 7/2001 |

OTHER PUBLICATIONS

ISR for PCT/GB2008/050879 dated Apr. 23, 2009.

(Continued)

*Primary Examiner* — Christopher P Ellis
*Assistant Examiner* — Medhat Badawi
(74) *Attorney, Agent, or Firm* — Lowe Hauptman Ham & Berner LLP

(57) ABSTRACT

A method of designing and manufacturing apparatus. The method comprises: creating a design space; analysing expected loads acting on the design space to calculate a first load path within the design space; analysing expected loads acting on the design space when the apparatus is in a damaged state to calculate a second load path within the design space; selecting a region of the second load path which falls outside the first load path; and creating a final design which includes: a primary structure falling within the first load path; and a damage indication feature falling within the selected region. The damage indication feature is designed to provide a visual indication when the load transmitted by the damage indication feature exceeds a threshold.

The load generates a stress in the primary structure which exceeds the stress in the damage indication feature until the primary structure becomes damaged, at which point the load generates a stress in the damage indication feature which exceeds the stress in the primary structure.

13 Claims, 7 Drawing Sheets

U.S. PATENT DOCUMENTS 5,895,892 A * 4/1999 Braun .............................. 177/45
5,927,646 A * 7/1999 Sandy et al. .................. 244/108
6,488,434 B1 * 12/2002 Graeff .............................. 403/2
6,776,370 B2 * 8/2004 Struzik et al. .............. 244/17.27
8,220,744 B2 * 7/2012 Benthien ...................... 244/131
2006/0088400 A1 * 4/2006 Matich et al. ................. 411/367

OTHER PUBLICATIONS

British Search Report for GB0719272.7 dated Jan. 24, 2008.

* cited by examiner

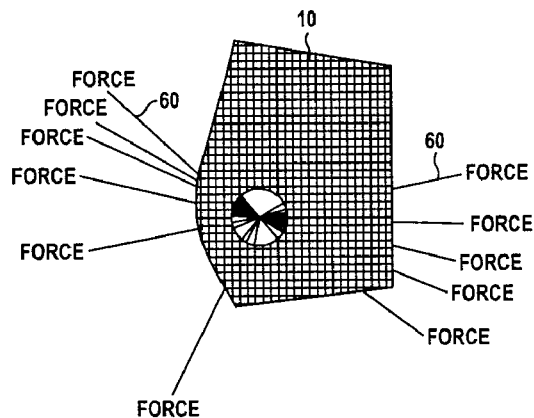
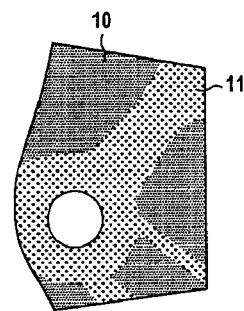
FIGURE 1
FIGURE 2
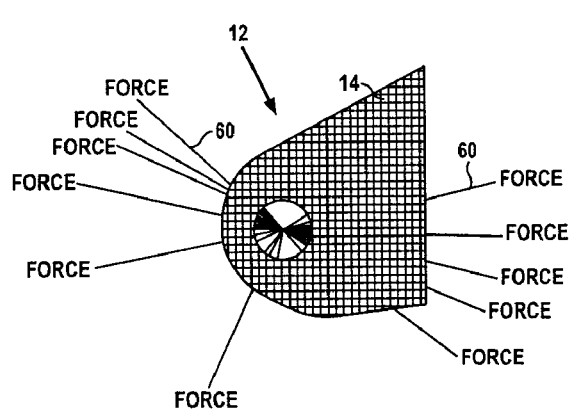
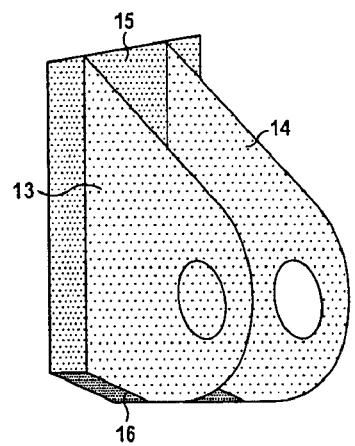
FIGURE 3
FIGURE 4

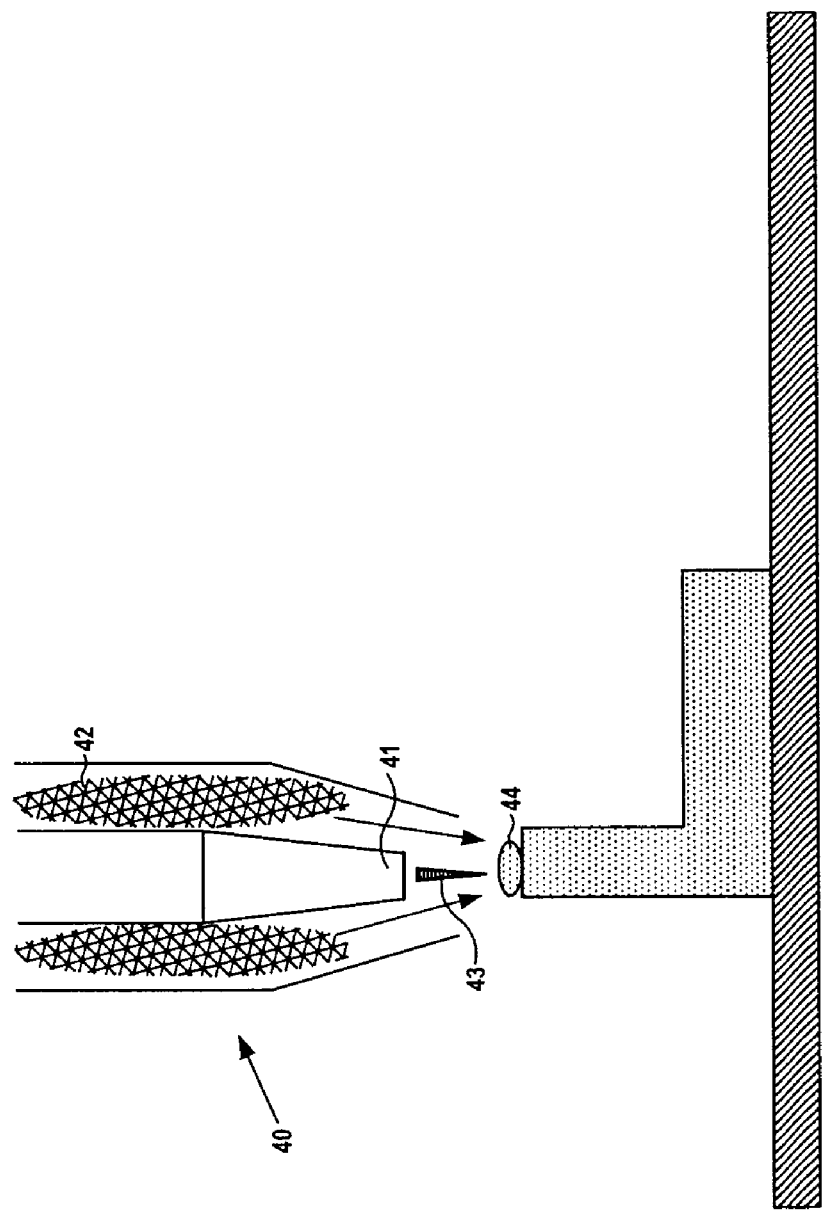

APPARATUS WITH DAMAGE INDICATION FEATURE

RELATED APPLICATIONS

The present application is national phase of International Application Number PCT/GB2008/050879, filed Sep. 29, 2008, and claims priority from, British Application Number 0719272.7, filed Oct. 4, 2007, the disclosures of which are hereby incorporated by reference herein in their entirety.

FIELD OF THE INVENTION

The present invention relates to apparatus for transmitting load, and methods of designing and manufacturing such apparatus. The apparatus includes a damage indication feature which is designed to provide a visual indication when the load transmitted by the damage indication feature exceeds a threshold. The apparatus may be used as part of an aircraft, or in any other application.

BACKGROUND OF THE INVENTION

In December 1978, the Federal Aviation Administration (FAA) amended their Fatigue Evaluation requirements for Transport Category Airplanes to include a damage tolerance philosophy. Prior to this time FAR 25.571, Fatigue Evaluation of Flight Apparatus, included an option to design to either "Fail-Safe" or "Safe-Life" principles. Manufacturers generally adopted the Fail-Safe option with the exception of a few components. In satisfying the regulations according to the Fail-Safe option, apparatus is designed to be redundant, so that catastrophic failure will not result after fatigue failure or obvious partial failure of a single principal structural element. However, the Fail-Safe approach does not include a disciplined engineering evaluation of crack growth and residual strength characteristics of each principal structural element using fracture mechanics technology necessary to specify inspection methods, thresholds and frequency that would detect damage prior to catastrophic failure.

Thus, in December 1978 the FAA released amendment 45 to FAR 25.571 requiring that new apparatus be designed to "Damage Tolerant" principles unless it could be shown that this approach would be impractical whereupon a "Safe-Life" option could be used. In May 198, an advisory circular AC-91.56 was issued to provide guidance material for the issue of supplemental Inspection Documents (SIDs) for existing Large Transport category Airplanes. Thus for both new designs and existing aircraft it is expected that engineering evaluation of the apparatus under typical load environmental spectra must show that catastrophic failure due to fatigue, accidental damage or corrosion will be avoided throughout the operational life of the aircraft. Since then, inspection programs for both new designs and existing older aircraft have been put in place based on a damage tolerance philosophy.

The above-mentioned inspection program of structural parts became part of the scheduled maintenance of the aircraft. From the airline perspective, it is desired to minimize the out-of-service maintenance, the cost of the inspection type and the labour involved in the activity. In other words fast inspection and long inspection intervals are desired. From the manufacturer's perspective, it needs to comply with airworthiness requirements while designing the part, accounting for uncertainties in the material characteristics, manufacturing processes, operational life of the aircraft and finally provide a cost effective design.

The challenge to comply with the Damage Tolerant philosophy while designing a cost effective part is increased if the most critical locations for future fatigue damage are in areas which are difficult to access and inspect. This can add a significant cost if inspection access needs to be provided through disassembly of parts, and some damage (such as crack initiation) can occur in this disassembly process. Disassembly may also be impractical if parts are bonded or co-cured. Therefore, every reasonable effort is made at the design stage to ensure inspectability of all structural parts and to quantify them under the damage tolerance provisions. In those cases where inaccessible and blind areas exist and suitable damage tolerance cannot practically be provided to allow for extension of a safe damage into detectable areas, the apparatus is shown to comply with the fatigue ("Safe-Life") requirements in order to ensure its continued airworthiness.

SUMMARY OF THE INVENTION

A first aspect of the invention provides apparatus for transmitting load, the apparatus comprising:
  a primary structure designed to transmit the load via a primary load path; and
  a damage indication feature which is positioned outside the primary load path and is designed to transmit at least a portion of the load only after the primary structure has become damaged, the damage indication feature being designed to provide a visual indication when the load transmitted by the damage indication feature exceeds a threshold and before the damage in the primary structure causes a critical failure of the primary structure;
wherein the load generates a stress in the primary structure which exceeds the stress (preferably the maximum stress) in the damage indication feature until the primary structure becomes sufficiently damaged, at which point the load generates a stress in the damage indication feature which exceeds the stress (preferably the maximum stress) in the primary structure.

A further aspect of the invention provides a method of indicating damage to a primary structure, the method comprising:
  a. transmitting load via a first load path in the primary structure when the primary structure is in an un-damaged state; and
  b. transmitting load via a different second load path after the primary structure has become damaged, the second load path including a damage indication feature which provides a visual indication when the load transmitted by the damage indication feature exceeds a threshold and before the damage in the primary structure causes a critical failure of the primary structure;
wherein during step a. the load generates a stress in the primary structure which exceeds the stress (preferably the maximum stress) in the damage indication feature, and during step b. the load generates a stress in the damage indication feature which exceeds the stress (preferably the maximum stress) in the primary structure.

A further aspect of the invention provides a method of designing the apparatus of the first aspect, the method comprising:
  a. creating a design space;
  b. analysing expected loads acting on the design space when the apparatus is in an undamaged state to calculate a first load path within the design space;
  c. analysing expected loads acting on the design space when the apparatus is in a damaged state to calculate a second load path within the design space;

d. selecting a region of the second load path which falls outside the first load path; and e. creating a final design which includes:
   a primary structure falling within the first load path; and
   a damage indication feature falling within the region selected in step d., the damage indication feature being designed to provide a visual indication when the load transmitted by the damage indication feature exceeds a threshold.

A further aspect of the invention provides a method of manufacturing the apparatus of the first aspect, the method comprising designing the apparatus by the method of the previous aspect; and manufacturing the apparatus according to the final design created in step e.

A further aspect of the invention provides a method of inspecting the apparatus of the first aspect for damage, the method comprising inspecting the damage indication feature for a visual indication that the load transmitted by the damage indication feature has exceeded a threshold.

The damage indication feature provides an early warning of failure of the primary structure. However, in contrast with a conventional mechanical fuse, the feature is positioned outside the primary load path and designed, configured or adapted to transmit at least a portion of the load only after the primary structure has become damaged. Therefore even after the feature has failed, the primary structure typically has sufficient residual strength capability to perform its function and sustain further damage until the next inspection threshold.

Preferably the damage indication feature is located in an easily accessible area where it can be spotted by a simple inspection performed with the naked eye or with no more than a magnifying glass. The damage indication features can also be used as a back up of failure detection in combination with traditional methods.

In the case of an aircraft the load transmitted by the primary structure may comprise flight loads, ground loads, pressurization loads and/or control loads. Typically the load comprises a spectrum of loads including static and dynamic loads including thermal loads and loads resulting from the weight of the apparatus itself.

The damage indication feature is designed to provide a visual indication when the load transmitted by the damage indication feature exceeds a threshold before the damage in the primary structure causes a critical failure of the primary structure. The feature may be designed in a number of different ways to achieve this. For instance the damage indication feature may have a maximum thickness which is lower than a minimum thickness of the primary structure, or may be formed from a more fragile material or one with a lower yield stress. In one example the damage indication feature comprises an elongate strut extending across a gap between a pair of opposing elements in the primary structure.

The damage indication feature may be designed to crack, break or deform plastically when the load transmitted by the damage indication feature exceeds a threshold.

The damage indication feature may be attached to the primary structure as a separate piece, or formed together with the primary structure as a single piece, for instance by additive fabrication. Preferably the additive fabrication method forms the primary structure and the damage indication feature by the sequential delivery of energy and/or material to specified points in space, for instance by stereolithography or selective laser sintering (either powder bed or powder feed).

In the embodiments described below the apparatus forms part of an aircraft, although similar design principles may be applied to other applications.

BRIEF DESCRIPTION OF THE DRAWINGS

Embodiments of the invention will now be described with reference to the accompanying drawings, in which:

FIG. 1 shows a first design space;
FIG. 2 shows a first optimum load path;
FIGS. 3 and 4 show a second design space;
FIG. 14 is a schematic view of a powder feed manufacturing process.

DETAILED DESCRIPTION OF EMBODIMENT(S)

Figure 5:
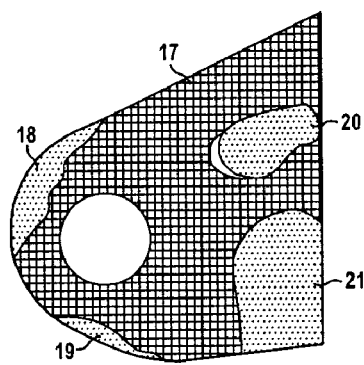
FIG. 5 shows a second optimum load path.

A series of steps in designing an aileron bracket are illustrated in FIGS. 1-10. A first design space 10 is defined as shown in FIG. 1. Next, twelve expected forces 60 acting on the first design space 10 are analysed by finite element analysis to calculate an optimum load path 11 shown in FIG. 2 (the contiguous central area in FIG. 2 constituting the optimum load path). This load path 11 is interpreted to create a second design space 12 shown in FIGS. 3 and 4. This design space 12 defines a pair of plates 13, 14 and a pair of flanges 15,16. Next, the twelve expected forces 60 acting on the second design space 12 are modelled by finite element analysis based on three sub-cases:
   sub-case 1—no failure
   sub-case 2a—initial failure of the connection between the flange 15 and the adjacent structure
   sub-case 3a—initial failure of the connection between the flange 16 and the adjacent structure Specifically, the initial failure in sub-case 2a is modelled as follows. The flange 15 is modelled as being connected to the adjacent structure by an array of vertical rows of points. This array includes a pair of rows of connection points aligned with the plates 13, 14, and various additional rows between the plates 13, 14 and to either side of the plates 13,14. The initial failure is modelled by deleting the two rows of connection points aligned with the plates 13, 14, but leaving the remaining rows of connection points attached to carry the load. Sub-case 3a is modelled in a similar way—that is by failing some but not all of the connection points between the flange 16 and the adjacent structure.

The optimum load path 17 from this iteration of the design process is shown in FIG. 5 (the contiguous central area in FIG. 5 constituting the optimum load path 17). Note that four regions labelled 18-21 fall outside this optimum load path.

Next, the expected loads acting on the second design space 12 are modelled by finite element analysis based on three sub-cases:
   sub-case 1—no failure
   sub-case 2b—complete failure of the connection between the flange 15 and the adjacent structure
   sub-case 3b—complete failure of the connection between the flange 16 and the adjacent structure Specifically, the complete failure is modelled in sub-case 2b and 3b by deleting all of the connection points between the respective flange and the adjacent structure. Therefore in sub-case 2b the flange 16 carries all of the load, and in sub-case 3b the flange 15 carries all of the load.

Figure 6:
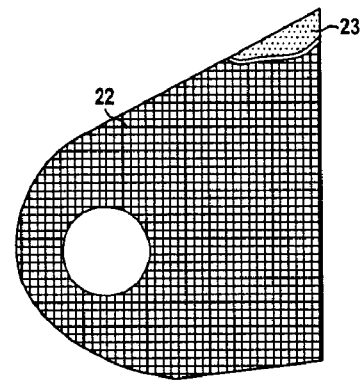
FIG. 6 shows a third optimum load path.

The optimum load path 22 from this iteration of the design process is shown in FIG. 6. Note that this load path 22 covers virtually the entire fitting apart from a small region 23.

Figure 7:
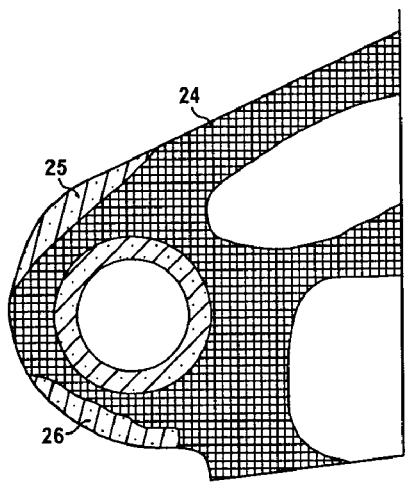
FIG. 7 is a side view of a final design.
Figure 8:
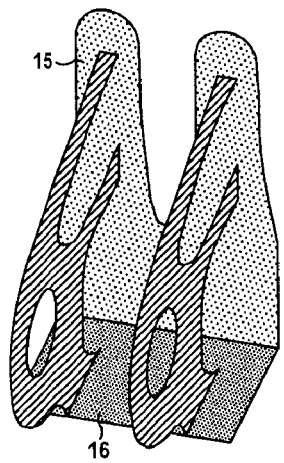
FIG. 8 is an isometric view of the final design.
Figure 9:
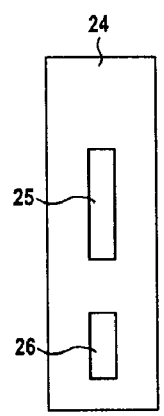
FIG. 9 is a front view of the final design.

Next, one or more regions 18-21 of the load path 22 which fall outside the load path 17 is selected. In this example, regions 18 and 19 are selected. Next, a final design shown in FIGS. 7-9 is created by interpretation of the load paths 17, 22. This includes: a primary structure 24 falling within the load path 17; and damage indication features 25,26 falling within the regions 18,19 which lie within the secondary load path 22 but outside the primary load path 17. The primary structure 24 is a damage tolerant design with sufficient residual strength capability to sustain the initial failures modelled in sub-cases 2a and 3a for a large number of flights, and to sustain the complete failures modelled in sub-cases 2b or 3b for a smaller number of flights.

Figure 10:
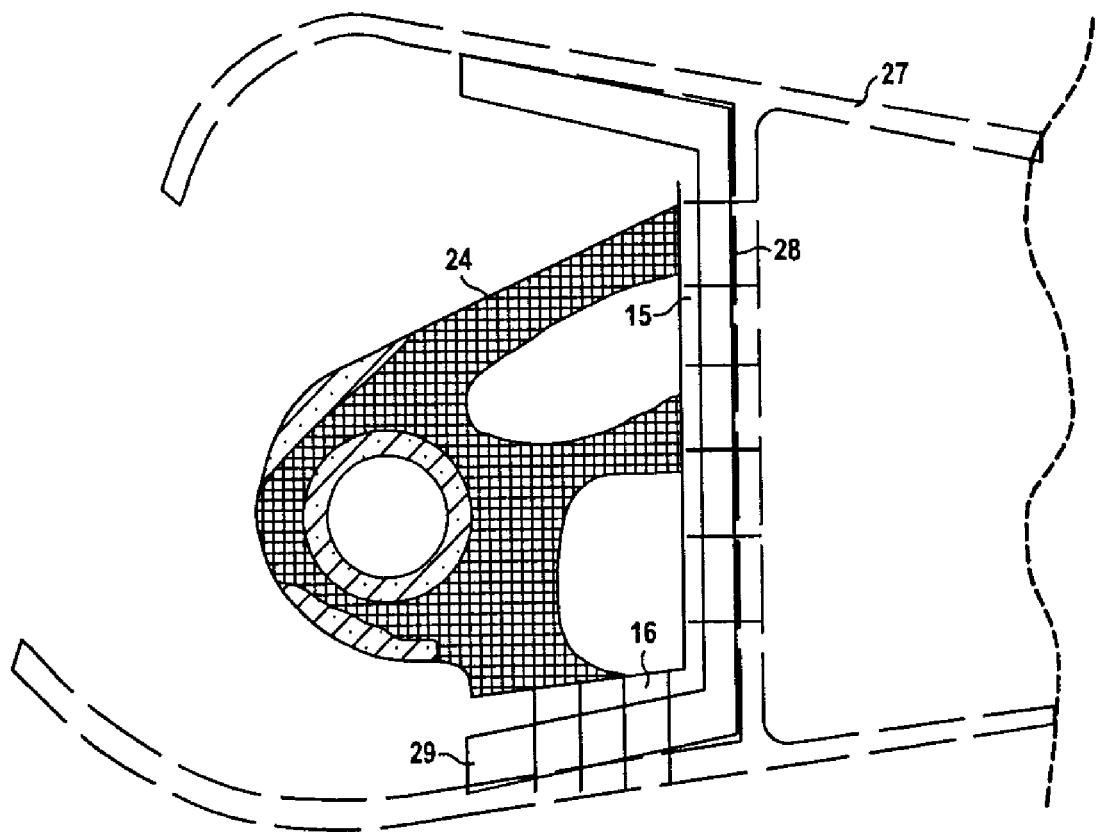
FIG. 10 shows a fitting manufactured according to the final design, installed in an aileron.

The fitting is attached to an aileron 27 as shown in FIG. 10. The flanges 15,16 are attached to a spar web 28 and lower cap 29 respectively by bolts, rivets or other fasteners; or by bonding. Note that sub-cases 2 and 3 are based on the expected loads when initial or complete failures are induced in the connection between the fitting and the spar web 28 and the bottom cap 29 respectively. For instance the initial failure (sub-cases 2a and 3a) may be based on some of the fasteners failing, and the complete failure (sub-cases 2b and 3b) may result from all fasteners failing.

The damage indication features 25,26 are intentionally weakened relative to the primary structure 24, so that they provide a visual indication when they transmit a load exceeding a threshold prior to the damage in the primary structure 24 causing a critical failure. Specifically, as shown in the front view of FIG. 9, the thickness of the features 25,26 is lower than the thickness of the primary structure 24. As a result, these features 25,26 plastically deform, crack and/or rupture if and when they carry excessive loads. Note that features 25, 26 are shown as solid continuous parts, but they may incorporate holes in their centres which prevent cracks propagating through to the primary structure 24.

Figure 11:
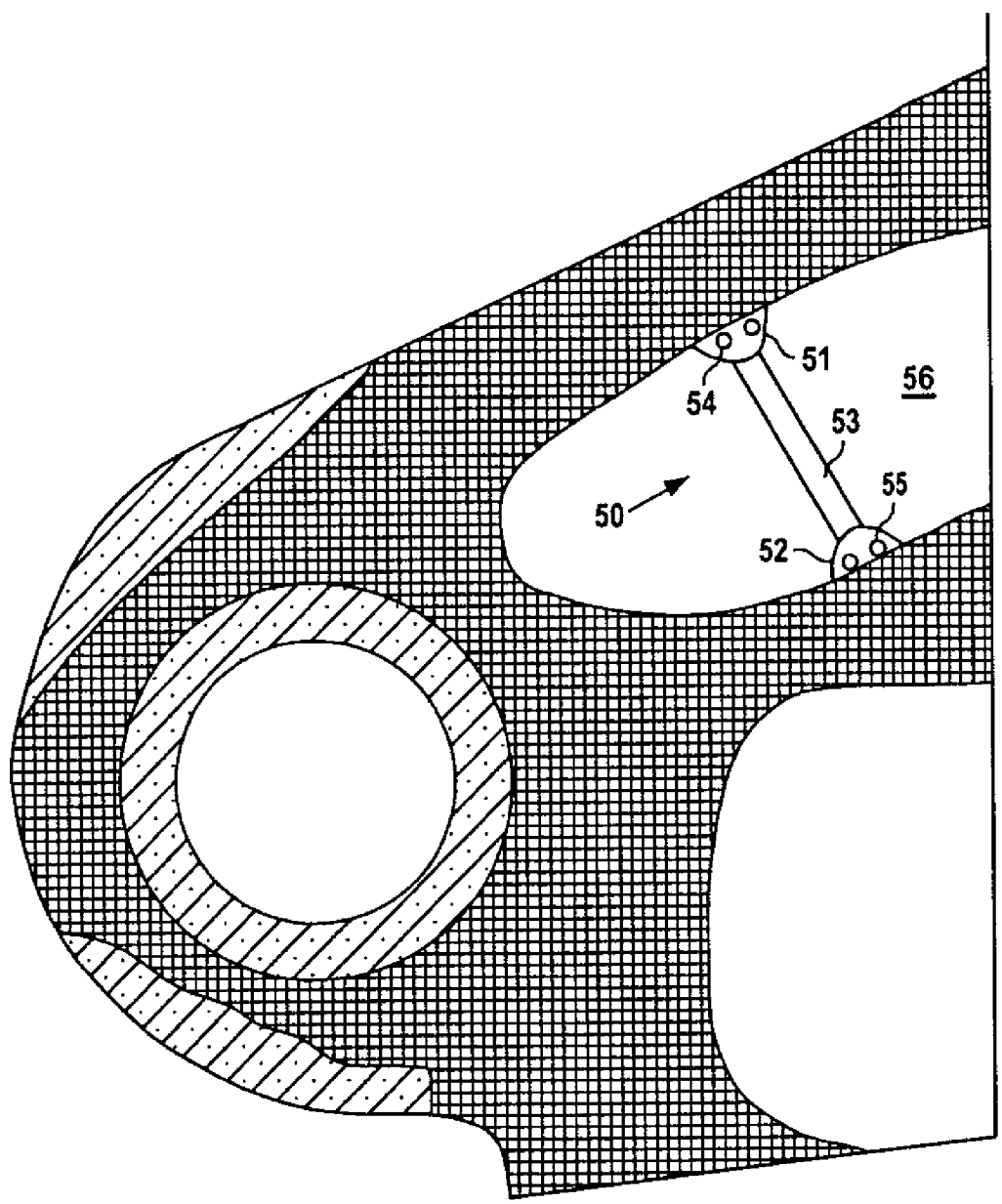
FIG. 11 shows a further damage indication feature.

A further damage indication feature 50 is shown in FIG. 11. In this case the feature 50 is positioned in the region 20 shown in FIG. 5. The feature 50 comprises a pair of lugs 51,52 mounted on opposing legs of the primary structure. An elongate strut 53 is attached to the lugs by rivets 54,55 and extending across a gap 56 between the pair of opposing legs. In the event of an excessive load, the strut 53 will deform plastically, crack or rupture. The strut can then be removed and replaced easily, in contrast to the features 25, 26 which are formed integrally with the primary structure 24.

Figure 12:
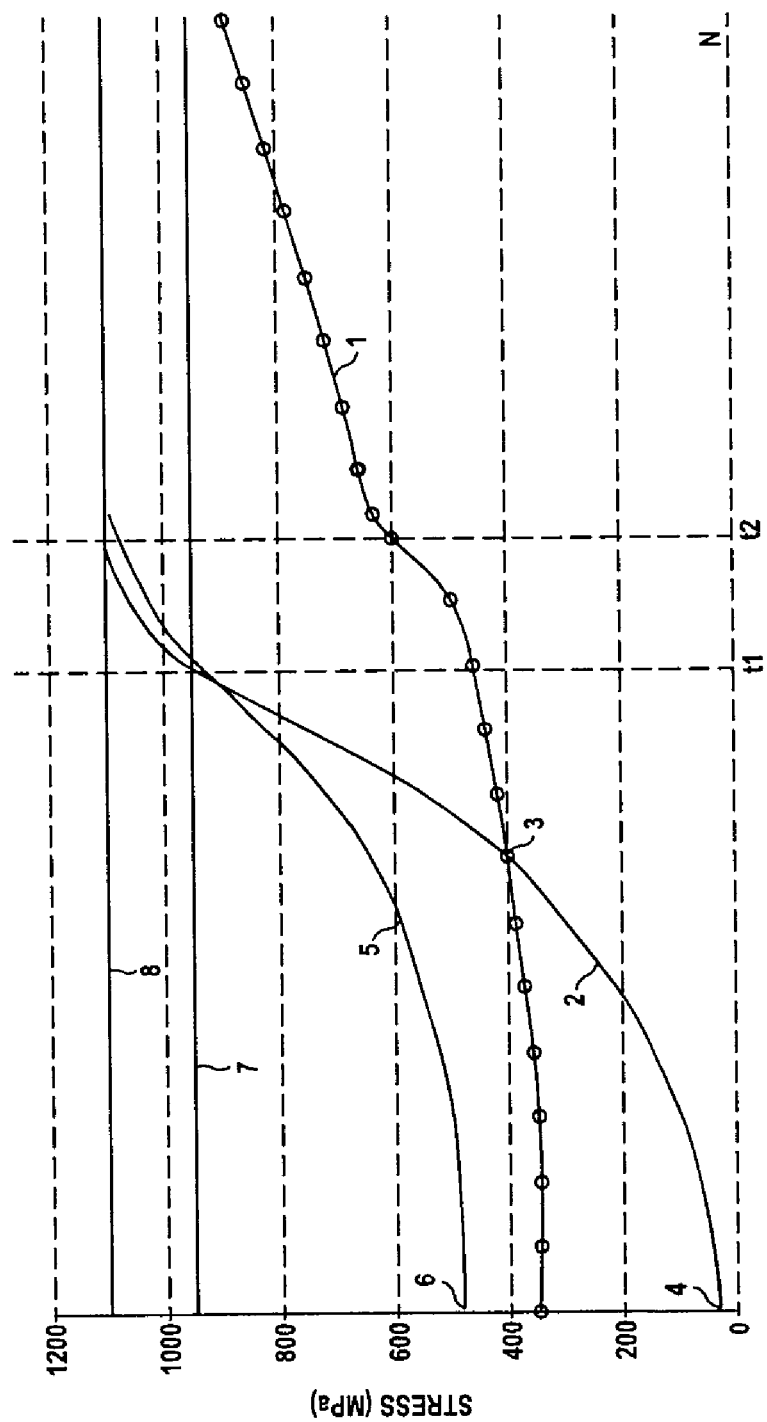
FIG. 12 is a graphical view of the performance of the fitting.

A graphical view of the performance of the fitting is presented in FIG. 12. Each data point on curve 1 illustrates the maximum stress in the primary structure 24 during the Nth flight of the aircraft. Each data point on the curve 2 illustrates the maximum stress in one of the damage indication features 25,26 during the Nth flight. The yield stress of the material is indicated at 7 and the rupture stress is indicated at 8.

Note that the location in the primary structure and the damage indication feature which carries this maximum stress will vary over time.

At time t1 the maximum stress in the damage indication feature reaches the yield stress of approximately 950 MPa. However the occurrence of plastic deformation in the damage indication feature at this point is not critical as the primary structure 24 provides enough strength during the instability period after event t1.

At this stage (t1) the rate of propagation of damage in the primary structure 24 increases and its residual strength decreases at a higher rate too. Thus, it is mandatory to detect this damage at this point in time. Visible plastic deformation of the damage indication feature provides an indication of a problem and that further inspection is necessary. After time t2 the primary structure will remain functional but the rupture of the damage indication feature will give a clear indication of a problem.

Note that before the point 3 where the curves 1 and 2 intersect, the load generates a maximum stress 1 in the primary structure 24 which exceeds the maximum stress 2 in the damage indication feature. In fact, initially the damage indication feature carries substantially no load (and hence substantially no stress) as indicated by data point 4.

However, as the number of flights increases, the primary structure 24 becomes more damaged so that an increasing amount of load is carried by the damage indication feature, until at intersection point 3 the maximum stress in the damage indication feature begins to exceed that in the primary structure.

This can be contrasted with the maximum stress experienced by a hypothetical conventional mechanical fuse as indicated by curve 5 in FIG. 12. A conventional mechanical fuse lies within the primary load path of the component and therefore experiences a maximum stress which exceeds the maximum stress in the primary structure at all times, even before any damage has occurred as indicated by data point 6.

Figure 13:
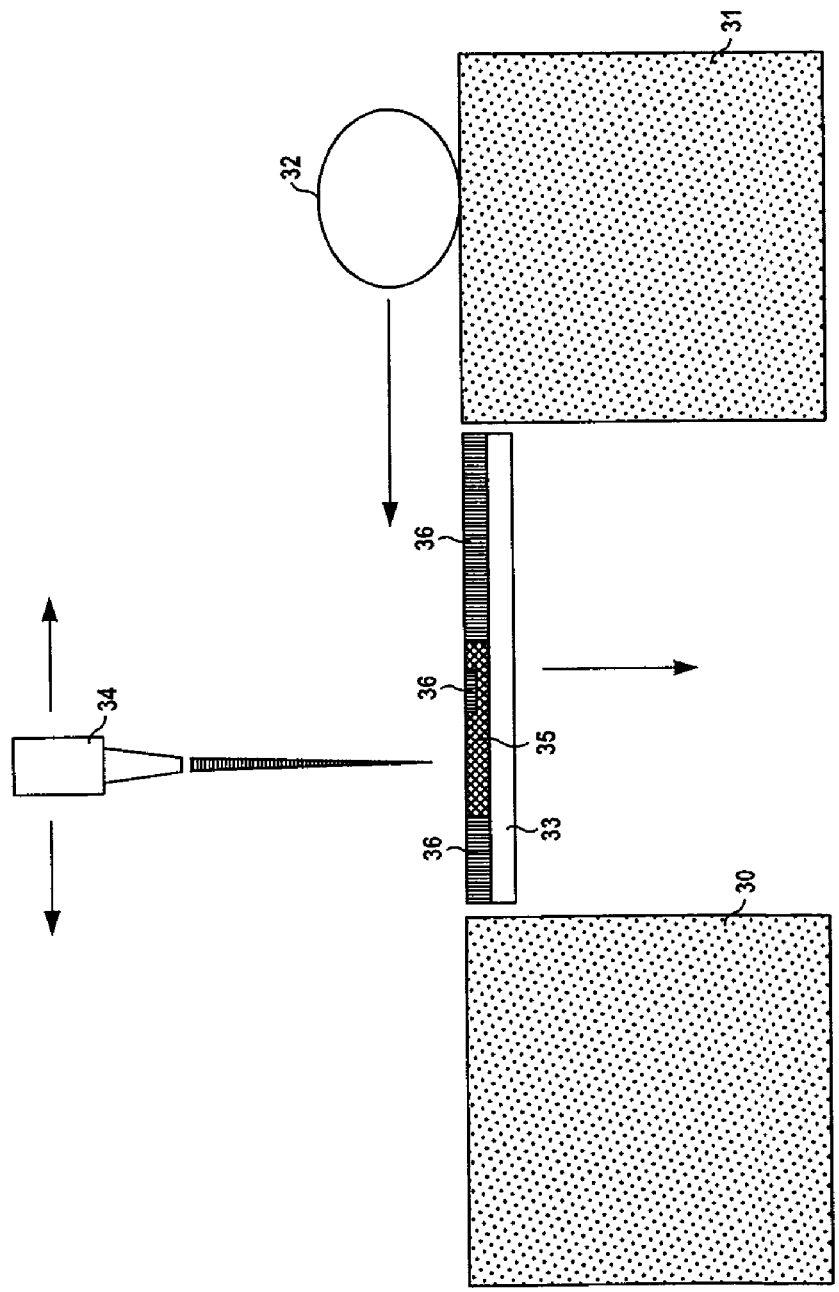
FIG. 13 is a schematic view of a powder bed manufacturing process.

The fitting may be grown in a series of layers by an additive fabrication process such as a selective laser sintering powder bed process as shown in FIG. 13, or a selective laser sintering powder feed process as shown in FIG. 14.

In the powder bed process shown in FIG. 13, the fitting is formed by scanning a laser head laterally across a powder bed and directing the laser to selected parts of the powder bed. More specifically, the system comprises a pair of feed containers 30, 31 containing powdered metallic material such as powdered Titanium. A roller 32 picks up powder from one of the feed containers (in the example of FIG. 13, the roller 32 is picking up powder from the right hand feed container) and rolls a continuous bed of powder over a support member 33. A laser head 34 then scans over the powder bed, and a laser beam from the head is turned on and off to melt the powder in a desired pattern. The support member 33 then moves down by a small distance (typically of the order of 0.1 mm) to prepare for growth of the next layer. After a pause for the melted powder to solidify, the roller 32 proceeds to roll another layer of powder over support member 33 in preparation for sintering. Thus as the process proceeds, a sintered part 35 is constructed, supported by unconsolidated powder parts 36. After the part has been completed, it is removed from support member 33 and the unconsolidated powder 36 is recycled before being returned to the feed containers 30, 31.

The powder bed system of FIG. 13 can be used to construct the entire fitting including the primary structure 24 and the damage indication features 25, 26 as a single piece. Movement of the laser head 34 and modulation of the laser beam is determined by a Computer Aided Design (CAD) model of the desired profile and layout of the part.

The powder feed fabrication system shown in FIG. 14 comprises a movable head 40 with a laser 41 and an annular channel 42 around the laser 41. Un-sintered powder flows through the channel 42 into the focus of the laser beam 43. As the powder is deposited, it melts to form a bead 44 which becomes consolidated with the existing material.

The powder feed system of FIG. 14 can be used to construct the entire fitting including the primary structure 24 and the damage indication features 25, 26 as a single piece, or to form the damage indication features 25, 26 on a conventionally machined primary structure. Movement of the head 40 and modulation of the laser beam 43 is determined by a Computer Aided Design (CAD) model of the desired profile and layout of the part.

Although the invention has been described above with reference to one or more preferred embodiments, it will be appreciated that various changes or modifications may be made without departing from the scope of the invention as defined in the appended claims.

The invention claimed is:

1. Apparatus for transmitting load, the apparatus comprising:
   a. a primary structure designed to transmit the load via a primary load path; and
   b. a damage indication feature which is positioned outside the primary load path and is designed to transmit at least a portion of the load only after the primary structure has become damaged, the damage indication feature being designed to provide a visual indication when the load transmitted by the damage indication feature exceeds a threshold and before the damage in the primary structure causes a critical failure of the primary structure;
   wherein the load generates a stress in the primary structure which exceeds the stress in the damage indication feature until the primary structure becomes sufficiently damaged, at which point the load generates a stress in the damage indication feature which exceeds the stress in the primary structure.

2. The apparatus of claim 1 wherein the damage indication feature has a maximum dimension which is lower than a minimum dimension of the primary structure.

3. The apparatus of claim 1 wherein the damage indication feature comprises an elongate strut extending across a gap between a pair of opposing elements in the primary structure.

4. The apparatus of claim 1 wherein the damage indication feature is designed to crack, rupture or deform plastically when the load transmitted by the damage indication feature exceeds a threshold.

5. The apparatus of claim 1 wherein the damage indication feature and the primary structure are formed as a single piece.

6. The apparatus of claim 5 wherein the damage indication feature and the primary structure are formed as a single piece by additive fabrication.

7. An aircraft comprising the apparatus of claim 1.

8. The aircraft of claim 7, wherein the load is generated by a spectrum of forces acting on the aircraft.

9. A method of indicating damage to a primary structure, the method comprising:
   a. transmitting load via a first load path in the primary structure when the primary structure is in an un-damaged state; and
   b. transmitting load via a different second load path after the primary structure has become damaged, the second load path including a damage indication feature which provides a visual indication when the load transmitted by the damage indication feature exceeds a threshold and before the damage in the primary structure causes a critical failure of the primary structure;
   wherein during step a. the load generates a stress in the primary structure which exceeds the stress in the damage indication feature, and during step b. the load generates a stress in the damage indication feature which exceeds the stress in the primary structure.

10. A method of inspecting the apparatus of claim 1 for damage, the method comprising inspecting the damage indication feature for a visual indication that the load transmitted by the damage indication feature has exceeded a threshold.

11. A method of designing the apparatus of claim 1, the method comprising:
   a. creating a design space;
   b. analysing expected loads acting on the design space when the apparatus is in an undamaged state to calculate a first load path within the design space;
   c. analysing expected loads acting on the design space when the apparatus is in a damaged state to calculate a second load path within the design space;
   d. selecting a region of the second load path which falls outside the first load path; and
   e. creating a final design which includes:
      i. a primary structure falling within the first load path; and
      ii. a damage indication feature falling within the region selected in step d., the damage indication feature being designed to provide a visual indication when the load transmitted by the damage indication feature exceeds a threshold.

12. A method of manufacturing the apparatus of claim 1, the method comprising designing the apparatus by the method of claim 11; and manufacturing the apparatus according to the final design created in step e.

13. Apparatus manufactured by the method of claim 12.

\* \* \* \* \*